United States Patent [19]
Jurenz et al.

[11] 3,765,310
[45] Oct. 16, 1973

[54] OPTICAL SYSTEM

[75] Inventors: Rolf Jurenz; Horst Kodalle, both of Dresden, Germany

[73] Assignee: VEB Pentacon Dresden Kamera-und Kinowerke, Dresden, Germany

[22] Filed: Nov. 12, 1971

[21] Appl. No.: 198,327

[52] U.S. Cl. .................................. 95/10 R, 355/68
[51] Int. Cl. .............................................. G01j 1/02
[58] Field of Search ..................... 95/10 R; 356/202, 356/203; 355/68

[56] References Cited
UNITED STATES PATENTS
3,635,135  1/1972  Ambraschka et al. .............. 95/10 R

*Primary Examiner*—Samuel S. Matthews
*Assistant Examiner*—Russell E. Adams, Jr.
*Attorney*—William A. Drucker

[57] ABSTRACT

A photo-electric measuring device includes an optical system for directing light emanating from a subject to be reproduced along an optical axis. Along the optical axis, a light source for projecting a light spot onto the subject via the optical system or a photo receiver for receiving light from the subject via the optical system is positioned. A segmental mirror is rotatably mounted with its reflective surface facing the optical system and disposed obliquely of the optical axis between the receiver or light source and the optical system. A respective light source or photo-electric receiver is positioned on the side of the optical axis. The segmental mirror permits light passage between the subject and the light source or photo-electric receiver positioned on the optical axis when a non reflective segment is positioned transversely of the optical axis and reflection of light between the photo-electric receiver or light source and the subject when a reflective segment of the mirror is positioned transversely of the optical axis to provide a light spot on the subject indicative of the measurement field and to detect light intensity of the measurement field.

2 Claims, 2 Drawing Figures

PATENTED OCT 16 1973  3,765,310

OPTICAL SYSTEM

BACKGROUND TO THE INVENTION

The invention relates to an optical system for photo-electric exposure measuring devices, which is positioned together with the photo-electric converter or photo-cell outside the path of the printing or reproduction rays, e.g., in the cameras with which microfilms are taken.

Photo-electric exposure measuring devices for reproduction purposes are known in which the original to be printed, owing to different light intensities over its surface, is measured in a defined area by a photo-electric receiver, in order to select the correct exposure for the film material. This measurement can be carried out either integrally, semi-integrally or partially. These known integral or semi-integral measuring methods can result in incorrect exposure as the originals are not completely scanned resulting in differences in density of points not used in the measurement process.

In partial exposure measurements a small area of the original is reproduced, i.e., partially, on the photo-receiver. With known partial exposure measuring devices for reproduction purposes, such as used for microfilm cameras, that point on the original which has the maximum intensity is measured individually, by moving the exposure measuring device manually into position above the surface to be measured. The measuring value thus found has to be used for setting the exposure or stored in a suitable manner for an automatic exposure process. After the measurement has been effected the exposure measuring device has to be moved away from the original in order to enable an exposure to be carried out.

SUMMARY OF THE INVENTION

The purpose of the invention is to simplify the exposure measurement and enable measurement to be carried out even during the printing or reproduction process.

According to the present invention there is provided a photo-electric measuring device comprising an optical system for directing light emanating from a subject to be reproduced along an optical axis, a light source positioned along the optical axis for projecting a light spot onto the subject via the optical system, a segmental mirror rotatably mounted with its reflective surface facing the optical system and disposed obliquely of the optical axis between the light source and the optical system and a photo-electric receiver positioned on one side of the optical axis for detecting light intensity arranged to receive light from the subject via the optical system and after reflection by the segmental mirror whereby in use rotation of the mirror effects interruption of the optical axis and when a non reflective segment of the mirror is positioned transversely of the optical axis a light spot from the source defines a measuring field on the subject while when a reflective segment is positioned transversely of the optical axis blocking of the light path from the light source and reflection of subject light from the measuring field onto the photo-electric receiver is effected.

An alternative form of the invention provides a photo-electric measuring device comprising an optical system for directing light emanating from a subject to be reproduced along an optical axis, a photo-electric receiver positioned along the optical axis for receiving light from the subject via the optical system, a segmental mirror rotatably mounted with its reflective surface facing the optical system and disposed obliquely of the optical axis between the photo-electric receiver and the optical system and a light source positioned on one side of the optical axis for projecting a light spot onto the subject via the optical system after reflection by the segmental mirror whereby in use rotation of the mirror effects interruption of the optical axis and when a reflective segment of the mirror is positioned transversely of the optical axis, a light spot from the source defines a measuring field on the subject while when a non reflective segment is positioned transversely of the optical axis reflection of light from the source onto the subject is prevented and light from the measuring field of the subject reaches the photo-electric receiver.

BRIEF DESCRIPTION OF DRAWINGS

The following schematic diagrams are provided.

DESCRIPTION OF PREFERRED EMBODIMENT

Figure 1:
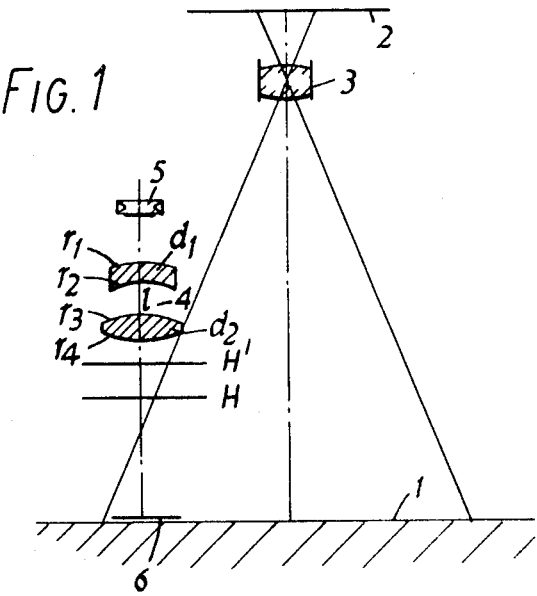
FIG. 1 shows a photo-electric exposure measuring device with an optical system outside the path of the illumination rays of a photographic printing device.

In a reproduction apparatus, not shown in detail, e.g., a microfilm camera in accordance with FIG. 1, a surface 1 is provided for receiving an original sheet to be reproduced. Parallel to the surface 1 there is positioned a film receiving surface 2 an objective lens 3 is mounted between the two surfaces 1 and 2. In use an original to be photographed not shown in the drawings is illuminated by an illumination device not shown in the drawing. An optical system 4 and a photo-receiver 5 are mounted outside a cone of rays projected by the objective lens 3. A measuring field 6 is situated in the plane 1 of the original, on the optical axis of the optical system. Main planes H and H' of the optical system 4 are situated between the field 6 and the optical system 4.

Figure 2:
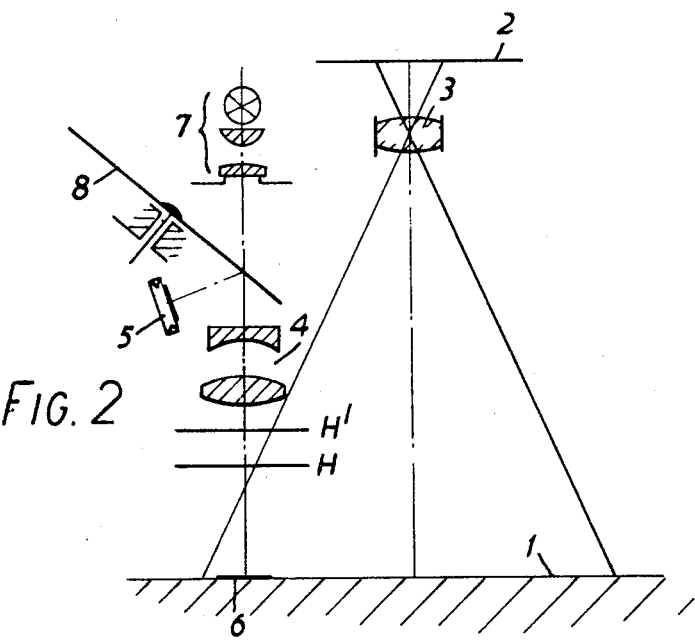
FIG. 2 shows a similar arrangement in which the optical system includes a photo-receiver in conjunction with an additional measuring field indicator device.

FIG. 2 shows the same optical system 4 again with the main planes H and H' situated between the field 6 and the optical system 4. An illumination device 7 provides a beam of light for indicating the measuring field in the plane 1 of the original and is provided on the optical axis of the optical system 4. Between the optical system 4 and the illumination device 7 a rotating segmental mirror 8 is mounted obliquely in relation to the axis of the optical system 4. This ensures that the light emanating from the illumination device 7, for indicating the measuring field 6 in the plane 1 of the original, is projected in accordance with the position of the segment mirror 8. When a non mirrored segment of the mirror is positioned on the optical axis the uninterrupted path of the rays, extends to the surface 1. When, during the exposure measuring operation, a mirrored portion of the mirror 8 obstructs the optical axis, light from the source 7 is blocked and does not reach the surface 1 and surface illumination existing at the measuring field 6 is reflected by the mirror 8, after passing through the optical system 4, onto the photo-receiver 5. Alternatively the positions of the photo-receiver 5 and illumination device 7 may be interchanged so that 5 is situated in the direct beam while 7 is situated in the reflected beam of the optical system 4.

Suitable constructional data for the two lens optical system 4 shown in FIGS. 1 and 2 are:

$$r_1/r_2 \approx +5;\ r_3/r_4 \approx -5;\ f'_2/1 \leqq 2,$$

where $r_1$, $r_2$, $r_3$ and $r_4$ are radius of curvature measurements of surfaces shown in FIG. 1 and $f'_2$ is the focal length of the system.

Numerical example: Focal length $f'_2 = +46.3$, millimeters

Scale of reproduction $\beta$ = size of image (mm.)/size of object (mm.) = $-2$.

| Radii in millimeters | Thickness in millimeters | Refractive index of glass $n_d$ |
|---|---|---|
| $r_1 = +63.325$ | $d_1 = 3$ | 1.5163 |
| $r_2 = +14.146$ | | |
| $r_3 = +175.76$ | $d_2 = 15$ | 1.6385 |
| $r_4 = -34.32$ | | |
| | $\iota = 24$ millimeters | $n_d = 1.0000$ |

Advantages offered by the invention are that partial measurement can be carried out with the exposure device even during the exposure process and that incorrect results, e.g., due to temporary voltage fluctuations and the influence of extraneous light in the plane of the original, are very largely avoided. The optical system is characterized by a simple structure of a two-membered aplanatically correct system, providing satisfactory aplanasia, e.g., with a reproduction scale $\beta$ of $-2$. A rotating segment mirror enables the projection of a light spot onto the subject plane during the exposure measuring operation. The resulting advantage is that during the exposure measurement the marking in the plane of the original is always visible, so that the operator can see at any time at what point on the original the photoelectric exposure measurement is taking place or can move to that point on the original which is to be selected.

We claim:

1. A photo-electric measuring device comprising an optical system for directing light emanating from an area of a subject to be reproduced along a first light path, a photo-electric receiver positioned in said first light path to receive light from said area, a light source positioned to project a light spot along a second light path onto said area via said optical system and a segmental mirror rotatably mounted and disposed obliquely of said first and second paths whereby said segmental mirror when rotated alternately interrupts said first path while directing light from said source along said second path onto said area to define the area being measured by the photo-electric receiver or interrupts said second path while directing light from said area onto said photo-electric receiver.

2. A photo-electric measuring device comprising an optical system for directing light emanating from an area of a subject to be reproduced along the axis of said optical system, a light source positioned on the axis for projecting a light spot onto said area via said optical system, a segmental mirror rotatably mounted having a reflective surface facing said optical system and disposed obliquely of said axis between the light source and said optical system and a photo-electric receiver positioned on one side of said axis for detecting light intensity arranged to receive light from said area via the optical system and after reflection by the segmental mirror whereby said segmental mirror when rotated alternately interrupts said first path while directing light from said source along said second path onto said area to define the area being measured by the photo-electric receiver or interrupts said second path while directing light from said area onto said photo-electric receiver.

* * * * *